United States Patent
Gonzalez

(10) Patent No.: US 10,305,898 B1
(45) Date of Patent: May 28, 2019

(54) SYSTEM AND METHOD TO IMPROVE MESSAGE SECURITY

(71) Applicant: Carlos Manuel Gonzalez, Mission, TX (US)

(72) Inventor: Carlos Manuel Gonzalez, Mission, TX (US)

(*) Notice: Subject to any disclaimer, the term of this patent is extended or adjusted under 35 U.S.C. 154(b) by 0 days.

(21) Appl. No.: 15/959,244

(22) Filed: Apr. 22, 2018

(51) Int. Cl.
*H04L 29/06* (2006.01)
*H04L 12/58* (2006.01)
*H04L 9/30* (2006.01)

(52) U.S. Cl.
CPC ............ *H04L 63/0869* (2013.01); *H04L 9/30* (2013.01); *H04L 51/12* (2013.01)

(58) Field of Classification Search
CPC ....... H04L 63/0869; H04L 9/30; H04L 29/06; H04L 12/58
USPC .......................................................... 713/170
See application file for complete search history.

(56) References Cited

U.S. PATENT DOCUMENTS

| | | | | |
|---|---|---|---|---|
| 8,997,191 B1* | 3/2015 | Stark | ...................... | G06F 21/32 713/173 |
| 2013/0067547 A1* | 3/2013 | Thavasi | .................. | G06F 21/31 726/7 |

* cited by examiner

*Primary Examiner* — Evans Desrosiers

(57) ABSTRACT

During secure communications between two parties, the identity of the message creator is not always certain. In many cases, the signature of the message is automatically generated by the computer of the sending party. On the other hand, the signature of the received message from the sender indicates only form whose account the message comes, but it may not be the sender himself sending the message. In this patent, we propose the use of a personal attribute to be included in the secure message protocols. This personal attribute could be the personal typing rhythm (keystroke dynamics) of the message originator. This patent defines a methodology and algorithms for two different cases: when the information is encrypted, and when it is not. Also included in this methodology are the cases where a Rhythm Certification Agency (RCA) is used to validate rhythm information, or without an RCA. A Rhythm Software Application running locally on the user computer to capture and analyze the users typing rhythm is included in this patent.

2 Claims, 8 Drawing Sheets

SYSTEM AND METHOD TO IMPROVE MESSAGE SECURITY

BACKGROUND OF THE INVENTION

A digital signature is the public-key equivalent of message authentication codes. As mentioned by Ferguson [7], the main problem is that (Alice) most of the time does not sign the message herself, but her computer automatically signs the messages for her. Thus, the signature only means that the message comes from Alice's account but it may not be Alice who is the one producing the message. Since the signature is automatic, Alice may not notice or be aware of this fact.

In this patent, we present two different and complementing approaches for the communication between two parties (i.e. Alice and Bob). The first approach is for the case when Alice and Bob frequently communicate with each other (i.e. they know the existence of each other), and the other approach is when they communicate but are not know to each other. In both cases as a minimum, the sender Alice is going to be required to perform an action, which is to type a text sent by the future message recipient. Alice will have to type and send the results of the rhythm of typing such a message. We assume that Alice's computer has the application software to collect such rhythm information. With Alice's rhythm, Bob will use Alice's rhythm information in his possession or use a third party agency that has Alice's rhythm information to assess if Alice is the sender. Therefore, the recipient will be able to trust more the authenticity of the sender. There are some previous patent efforts done by using the rhythm of typing for the purpose of authentication in electronic devices [1], [4], [8], and [9] and [12], many recent patents for secure network communications [14], [15] and [16] and many academic papers [2], [6], [10] and [11], but no patent or paper uses rhythm to enhance security protocols for message transmission like we propose in this patent.

REFERENCES

[1] Bender, et al. "Key sequence rhythm recognition system and method", U.S. Pat. No. 7,206,938, April 2007.
[2] Bergadano et al., "User authentication through keystroke dynamics", ACM Transactions on Information and System Security, Volume 5 Issue 4, November 2002, Pages 367-397.
[3] Bryce, Scott, "Cryptograms", http://scottbryce.com/cryptograms/stats.htm, accessed Mar. 20, 2015.
[4] Cho et al., "Apparatus for authenticating an individual based on a typing pattern by using a neural network system", U.S. Pat. No. 6,151,593, November 2000.
[5] Cornell University, "English Letter Frequency" https://www.math.cornell.edu/mec/2003-2004/cryptography/sub/frequencies.htm, accessed Nov. 18, 2016.
[6] Deng Y. and Zhong Y., "Keystroke Dynamics User Authentication Based on Gaussian Mixture Model and Deep Belief Nets", ISRN Signal Processing Volume 2013 (2013), Article ID 565183.
[7] Ferguson N., Schneier B., Kohno T. "Cryptography Engineering. Design Principles and Practical Applications," Wiley Publishing, Inc., 2010.
[8] Garcia; John D. "Personal identification apparatus", U.S. Pat. No. 4,621,334, November 1986.
[9] Gonzalez C., Avila M., and Moreno R, "Continuous Authentication Using User's Typing Rhythm And Application Selection For Security Of Mobile Electronic Devices", U.S. Patent Application No. 62/295,130, February 2016.
[10] Livia et al., "User Authentication Through Typing Biometrics Features", IEEE Transactions On Signal Processing, Vol. 53, No. 2, February 2005.
[11] Rangnath Dholi P., Chaudhar K. P., "Typing Pattern Recognition Using Keystroke Dynamics", Mobile Communication and Power Engineering, Volume 296 of the series Communications in Computer and Information Science pp 275-280, 2013.
[12] Serpa, Michael Lawrence, "System and method for user authentication with enhanced passwords", U.S. Pat. No. 6,954,862, October 2005.
[13] Larry V. Hedges (1981). "Distribution theory for Glass' estimator of effect size and related estimators". Journal of Educational Statistics. 6 (2): 107-128.
[14] Robba, Mauro et al., "Method for secure signal transmission in a telecommunication network, in particular in a local area network", U.S. Pat. No. 9,894,044, Feb. 13, 2018.
[15] Talati; Kirit K., "Apparatus, system and method for secure data exchange", U.S. Pat. No. 9,906,499, Feb. 27, 2018.
[16] Lester, Ryan et al., "System and method of cryptographically signing web applications", U.S. Pat. No. 9,906,369, Feb. 27, 2018.

SUMMARY OF THE INVENTION

The rhythm of typing has been used before to authenticate users in electronic devices. The rhythm procedure includes the creation of one or more patterns. The most well-known patterns with rhythm information are:
- Inactive time between two keystrokes (time between the end of the first and the time of pressing of the second)
- Time pressing a key (how long the key is pressed down)
- Location of the finger pressing the key
- Amount of pressure put on a pressed key
- Typing speed (in the long run)
- Time between X most used two letter words
- Time between Y most used three letter words
- Number of keys depressed by time unit
- Most Z mistakes made, and time to correct
- Rhythm and Time of the day
- Rhythm and geography These patterns will vary depending if the operating system and the hardware of the device support such measurement.

To make the system respond quicker, for some specific cases we recommend the use of a subset of the user's alphabet. For example to use 10 to 15 of the letters more frequently used in the English language [5], and these will be: E, T, A, O, I, N, S, R, H, D, L, U, C, M, and F.

The 15 most used letters constitute approximately 88% of the total use. In our rhythm algorithms we may include additional filters like the most common two letter words: of, to, in, it, is, be, as, at, so, we, he, by, or, on, do, if, me, my, up, an, go, no, us, am [3].

The system will save for each pattern the following information:
1. Count of number of times used
2. Minimum value recorded
3. Maximum value recorded
4. Sum of all values recorded Methodology When Alice wants to send a message to Bob, she first sends a request for dialog and a text for Bob to type and capture his typing rhythm.

We assume that Alice and Bob computers have the application software to collect such rhythm information.

Bob receives Alice's message and proceeds to type Alice's sent text and capture his typing rhythm, then he creates a text to send to Alice for checking her typing rhythm. Bob then sends back to Alice the data of his typing rhythm, and the text for Alice to capture her typing rhythm.

Alice receives Bob message containing his typing rhythm, and a text for Alice to capture her typing rhythm. Alice then proceeds to check the data sent by Bob of his typing rhythm. If Bob's typing rhythm information is available to Alice locally, she determines if the typing rhythm belongs or not to Bob. If Alice does not have locally Bob's typing rhythm, then she proceeds to send the rhythm inquiry to an independent third party Rhythm Certification Agency (RCA).

The Rhythm Certification Agency (RCA) compares and analyzes the data sent by Alice and the stored typing rhythm for Bob. Sends the answer back to Alice.

Alice receives the answer back from the RCA about Bob's typing rhythm. Generates a message for Bob, which could be "invalid signature", or "accepted identity". Alice also returns her own typing rhythm of Bob's send text.

Bob receives Alice's message, and will continue the process if everything goes ok. If Alice's typing rhythm information is available to Bob locally, he determines if the typing rhythm belongs or not to Alice. If Bob does not have locally Alice's typing rhythm, then he proceeds to send the rhythm inquiry to an independent third party Rhythm Certification Agency (RCA).

The Rhythm Certification Agency (RCA) compares and analyzes the data sent by Bob and the stored typing rhythm for Alice. Sends the answer back to Bob.

Bob receives the answer back from the RCA about Alice's typing rhythm. If the answer from the RCA is good, then Bob accepts Alice identity.

The cycle of communication between Alice and Bob as explained above is repeated as needed.

The RCA is a web server engine located on a network like the World Wide Web or any other private network. This engine accepts personal rhythm data from a subject being authenticated. The rhythm data sent by the user is then compared to information previously collected by the engine about the rhythm of the user. The engine then analyzes the sent rhythm data and reports a confidence rating indicating how well the sent rhythm matches the preciously collected rhythm data.

There are two main components to the RCA verification engine. The first component is answering to a request received from the user to be included in the RCA rhythm database. The second component of the RCA verification engine receives requests to verify the authenticity of a user using a sent rhythm information. This information will be compared to the RCA's stored data, analyzed and reported back.

The rhythm software application runs locally on the computers of the users will collect, analyze and store the rhythm measurements of user typing in the user's computer. This rhythm application software is composed of six software modules. The first module collects the user's rhythm on the local computer. The second module analyzes the measurements, saves the collected data and determines when the steady state of the measurements (i.e. the measurement does not change significantly the historical values of minimum and maximum values) has been achieved. The third module is the one who retrieves the stored user's information and prepares it in the proper format to be transmitted. The fourth module handles user requests: a request to type a given text and return the user's rhythm of such typing, a request to transfer the complete user's rhythm information currently in local storage, or an end to capture the rhythm for the given text. The fifth module is the Command Manager, which receives commands directly form the user, decodes the command and calls the appropriate module to handle the requested command. The sixth and last module is the module which stores and retrieves data for the whole software application.

It is important to notice that each different equipment used by the user will require to run a local rhythm software application, and may have different IDs for its rhythm information loaded in the RCA. This is required since the rhythm values may be different (i.e. the user may generate different rhythm values by using a laptop than from using a mobile phone). Also, the rhythm software application may be different for different Operating Systems, or for different computer hardware.

DETAILED DESCRIPTION OF THE INVENTION

Figure 1:
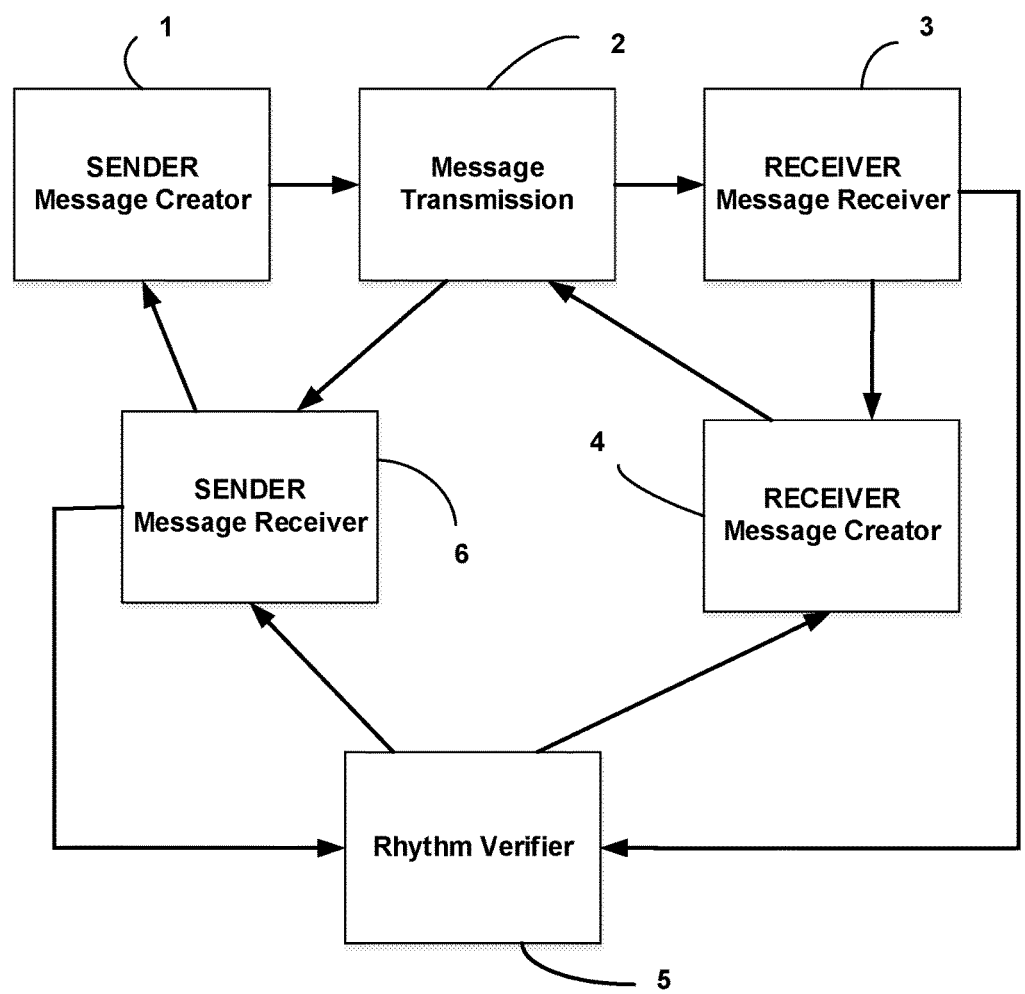
FIG. 1 is a conceptual diagram illustrating an embodiment of the communication method used between sender and receiver parties.

The general methodology process is described in FIG. 1. When a Sender (Alice) 1 wants to send a message to Receiver (Bob) 3, she first creates a request for dialog and a text for Bob 3 to type and capture his typing rhythm, then proceeds to send 2 the message to Bob 3.

Bob 3 receives Alice's 1 message and proceeds to type Alice's sent text and capture his typing rhythm, and then he creates a text 4 to send to Alice for 6 checking her typing rhythm. Bob 4 then sends back 2 to Alice 6 the data of his typing rhythm, and the text for Alice to capture her typing rhythm.

Alice 6 receives Bob message containing his typing rhythm, and a text for Alice to capture her typing rhythm. Alice 6 then proceeds to check the data sent by Bob 4 of his typing rhythm. Alice 6 sends Bob's typing rhythm information to a rhythm verifier 5 (notice that the rhythm verifier could be local to Alice or an independent third party Rhythm Certification Agency (RCA)). The Rhythm Certification Agency (RCA) or the local verifier 5 compares and analyzes the data sent by Alice 6 and the stored typing rhythm for Bob. Sends the answer back to Alice 6.

Alice 6 receives the answer back from the Rhythm verifier 5 about Bob's typing rhythm. Creates a message 1 for Bob 3, which could be "invalid signature", or "accepted identity". Alice 1 also returns her own typing rhythm of Bob's send text. The message is send 2 to Bob 3.

Bob 3 receives Alice's message, and if the identity was accepted, Bob 3 then proceeds to check 5 the data sent by Alice 1 of his typing rhythm. Bob 3 sends Alice's typing rhythm information to a rhythm verifier 5 (notice that the rhythm verifier could be local to Bob or an independent third party Rhythm Certification Agency (RCA)). The Rhythm Certification Agency (RCA) or the local verifier 5 compares and analyzes the data sent by Bob and the stored typing rhythm for Alice 1. Sends the answer back to Bob 4.

If the answer from the Rhythm verifier is good, then Bob accepts Alice identity and her message.

The cycle of communication between Alice 1 and Bob 3 as described above is repeated as many times as needed.

If at any given time the Sender (Alice) 1 or the Receiver (Bob) 3 get an "invalid signature" message from the Rhythm verifier, then they have the option of notifying the other party of this issue, or simply stop the communication with the other party.

Figure 2:
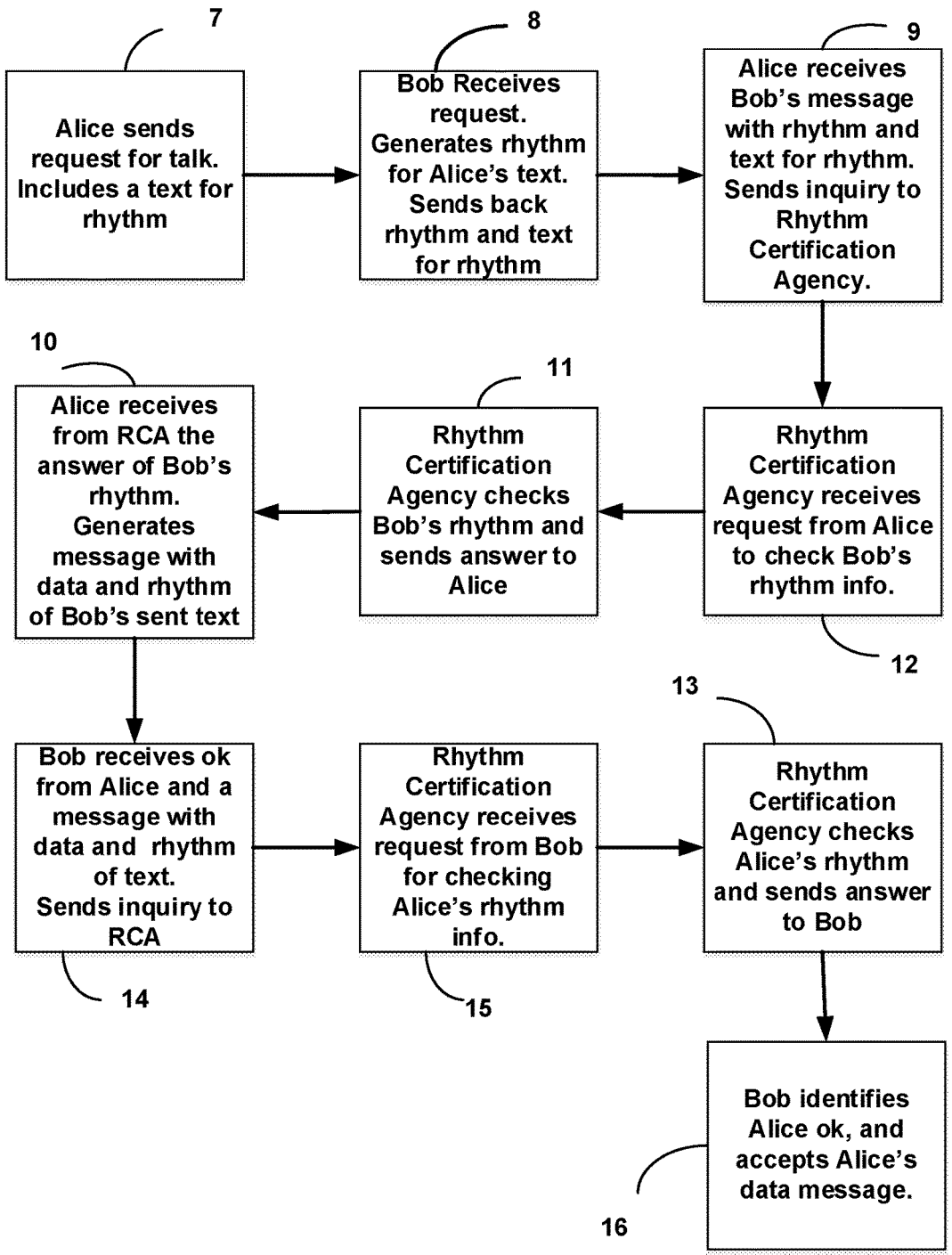
FIG. 2 is a block diagram illustrating the embodiment of a method to communicate between two parties interacting with a third party rhythm verifier.

An example in which the parties communicates without encryption, but make use of an independent third party Rhythm Certification Agency (RCA) is illustrated in FIG. 2.

Alice 7 sends a request for talk. Includes a text for rhythm.

Bob 8 receives request. Generates rhythm for Alice's text, and sends back typing rhythm and text for rhythm.

Alice 9 receives Bob's message with rhythm and text for rhythm. Sends inquiry to RCA.

The RCA 12 receives request from Alice to check Bob's rhythm info.

RCA 11 checks Bob's rhythm and sends answer to Alice 10.

Alice 10 receives from RCA the answer of Bob's rhythm. Generates message with data and typing rhythm of Bob's sent text.

Bob 14 receives ok from Alice 10 and a message with data and typing rhythm of text.

Sends inquiry to RCA 15.

The RCA 15 receives request from Bob for checking Alice's rhythm info.

RCA 13 checks Alice's typing rhythm and sends answer to Bob 16.

Bob 16 identifies Alice as ok, and accepts Alice's data message.

Again, if at any given time Alice or Bob get a not ok or an "invalid signature" message from the RCA, then they have the option of notifying the other party of this issue, or simply stop the communication with the other party.

Figure 3:
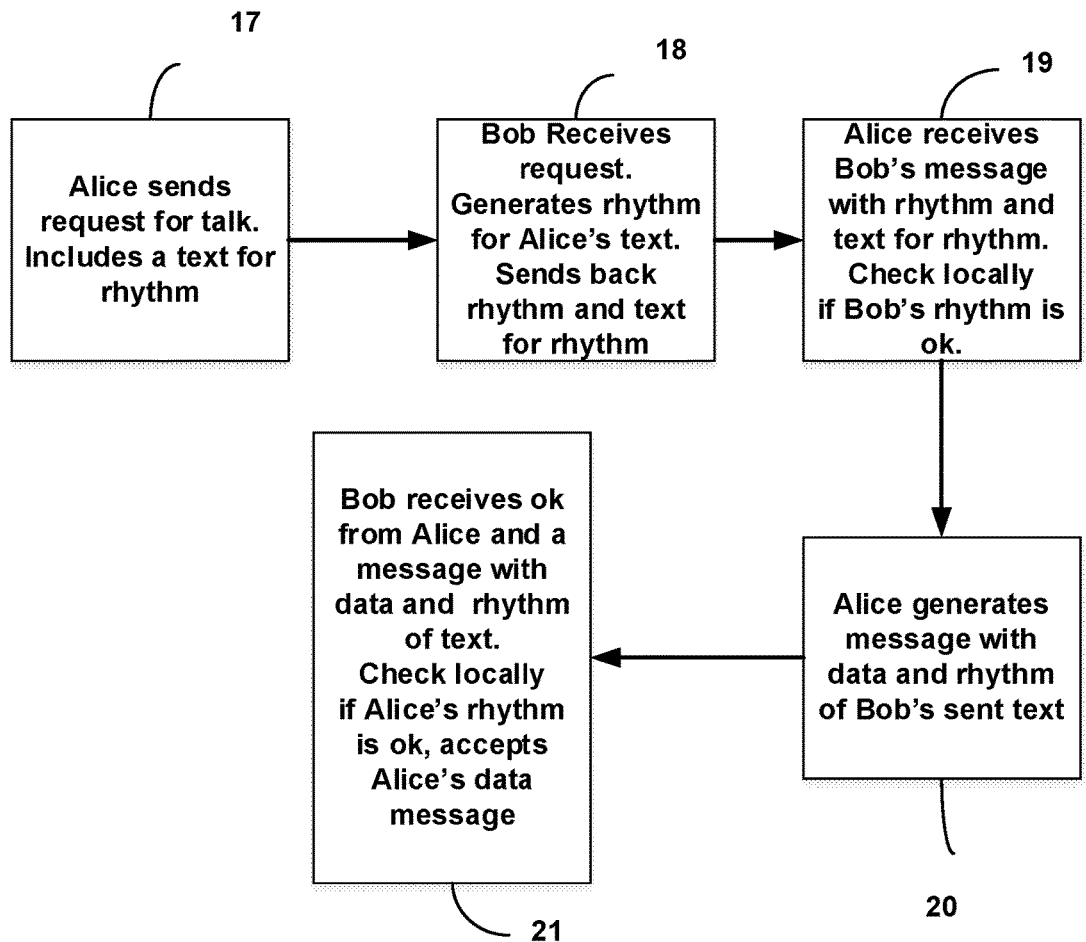
FIG. 3 is a block diagram illustrating the embodiment of a method to communicate between two parties using a local rhythm verifier.

FIG. 3 describes an example in which the parties communicates without encryption, and the rhythm verification is done locally.

Alice 17 sends a request for talk. Includes a text for rhythm.

Bob 18 receives the request. Generates typing rhythm for Alice's text, and sends back typing rhythm and text for rhythm.

Alice 19 receives Bob's message with his typing rhythm and text for her to type and obtain rhythm. Alice checks locally if Bob's typing rhythm is ok.

Alice 20 generates message with data and her typing rhythm of Bob's sent text.

Bob 21 receives ok from Alice and a message with data and her typing rhythm of text. Bob checks locally if Alice's typing rhythm is ok, accepts Alice's data message.

As before, if at any given time Alice or Bob obtain a not ok or an "invalid signature" message from the local rhythm verifier, then they have the option of notifying the other party of this issue, or simply stop the communication with the other party.

Figure 4:
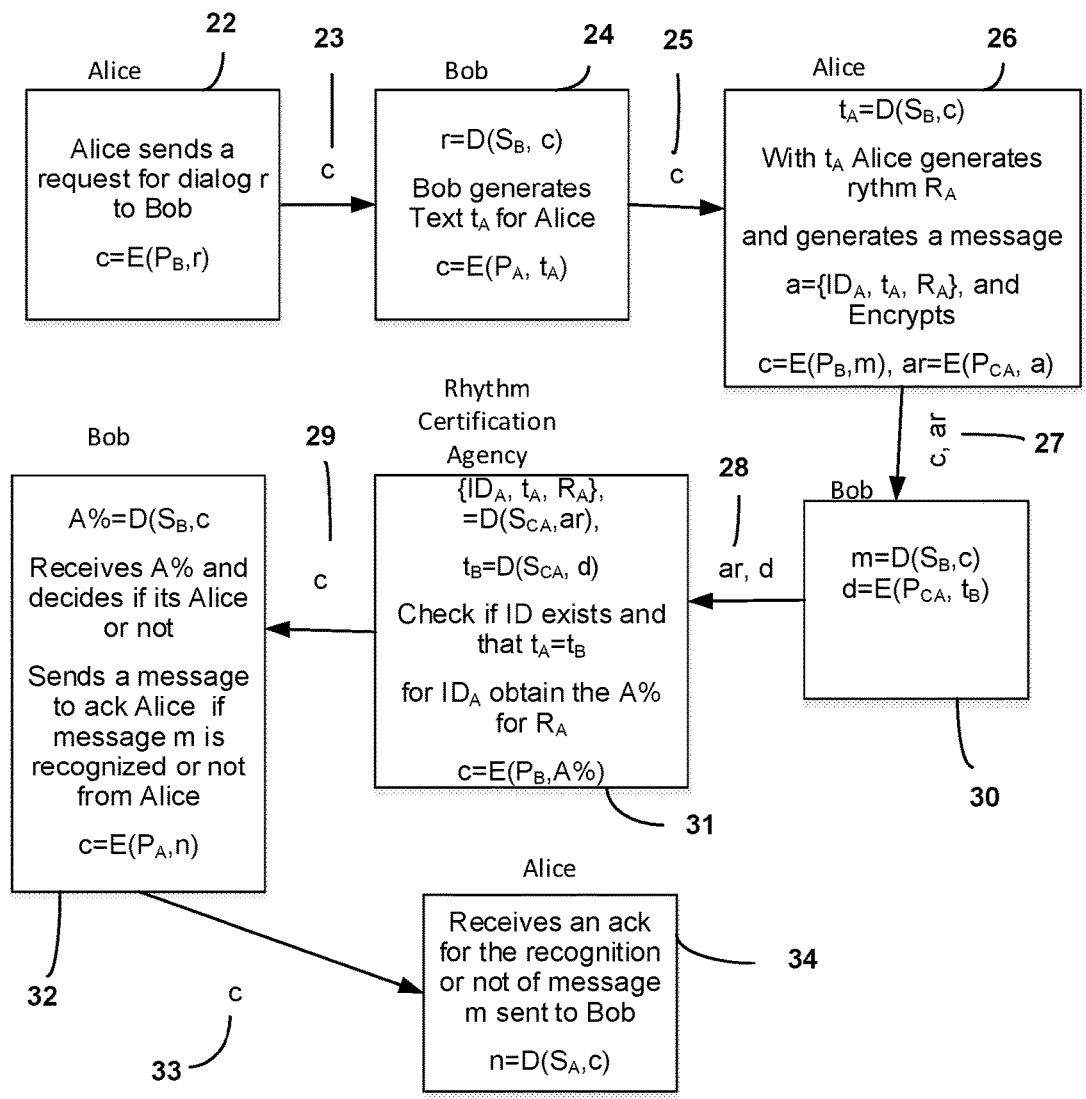
FIG. 4 is a block diagram illustrating the embodiment of a method to communicate between two parties using encryption and interacting with a third party rhythm verifier.

The algorithm described in FIG. 4 is an example in which the communicating parties use the Public-key Encryption methodology (asymmetric encryption) and make use of an independent third party RCA.

When Alice 22 wants to send a secure message to Bob, she first sends a request for dialog to Bob. To do this, Alice encrypts the request for dialog r using Bob's public key. Alice sends message c 23 over the channel which is the result of the described encryption, $c=E(P_B,r)$.

Bob 24 receives message c 23 from Alice and decodes it using Bob's secure key, $r=D(S_B,c)$. Since is a request for dialog from Alice, Bob proceeds to generate a text $t_A$ to send to Alice. Alice will have to type such text and send back her typing rhythm, $c=E(P_A,t_A)$ 25.

Alice 26 receives message c 25 from Bob, and proceeds to decode it using her secure key, $t_A=D(S_A,c)$. The message contains text t that Bob wants Alice to type and send her typing rhythm. The idea here is twofold: first is to make Alice do the action of typing the text instead of the computer, and second is to collect the typing rhythm of Alice as a proof of signature. Alice proceeds to type text $t_A$ and collects the rhythm of this action. This is done by software inside Alice's computer. The results of this action are data $R_A$ that will be sent to Bob but not for him to use, but to send to a third party Rhythm Certificate Agency (RCA) 31. Alice generates a message containing her ID at the RCA ($ID_A$), the text that Bob sent to type will be called now $t_A$, and the recorded typing rhythm $R_A$ that is: $a=\{ID_A, t_A, R_A\}$. This information is encrypted using the public key of the RCA, $ar=E(P_{CA}, a)$ 27. Finally, Alice encrypts the message m that she wants to send to Bob, $c=E(P_B,m)$ 27.

Bob 30 receives data c 27 and ar 27 from Alice 26. Using Bob's secure key decrypts the message m sent by Alice, $m=D(S_B,c)$. All Bob needs now is to make sure Alice is the one signing the message. To do this, Bob sends to the RCA the data ar 28 that Alice sent without making any changes, and includes a copy of the original text sent to Alice $t_A$ now called $t_B$, which will be encrypted using a private key for RCA, $d=E(P_{CA},t_B)$ 28.

The RCA 31 receives from Bob 30 data d and ar 28. The ar 28 contains Alice's ID, typing rhythm and text typed. The text initially used by Bob is sent in encrypted data d 28. RCA proceeds to decrypt using RCA's secure key $\{ID_A, t_A, R_A\}=D(S_{CA}, ar)$ and $t_B=D(S_{CA},d)$. With the ID of Alice $ID_A$, RCA 31 proceeds to check if this ID exists in its database, if not, the result will generate a negative result. RCA 31 also checks that the texts from Alice and Bob are the same $t_A=t_B$; otherwise, the search is invalid. RCA 31 computes the probability that the typing rhythm send by Bob is between the parameters (i.e. maximum and minimum values) existent for such an ID, and reports the values back to Bob (as A %) encrypting the values using the public key of Bob, $c=E(P_B, A \%)$ 29.

Bob 32 receives and decrypts the results from the RCA 31 using Bob's secure key, $A\% = D(S_B, c)$. With this information, Bob 32 decides if the message is signed by Alice 26 or not, and how much confidence should he have of Alice 26 being the message sender.

Bob 32 encrypts a message n for Alice using her Public key informing her of her trust, $c=E(P_A, n)$ 33.

Alice 34 decrypts message n sent by Bob 32 about his trust in her signature, $n=D(S_A, c)$. The cycle starting at 22 will be repeated as many times as needed.

Figure 5:
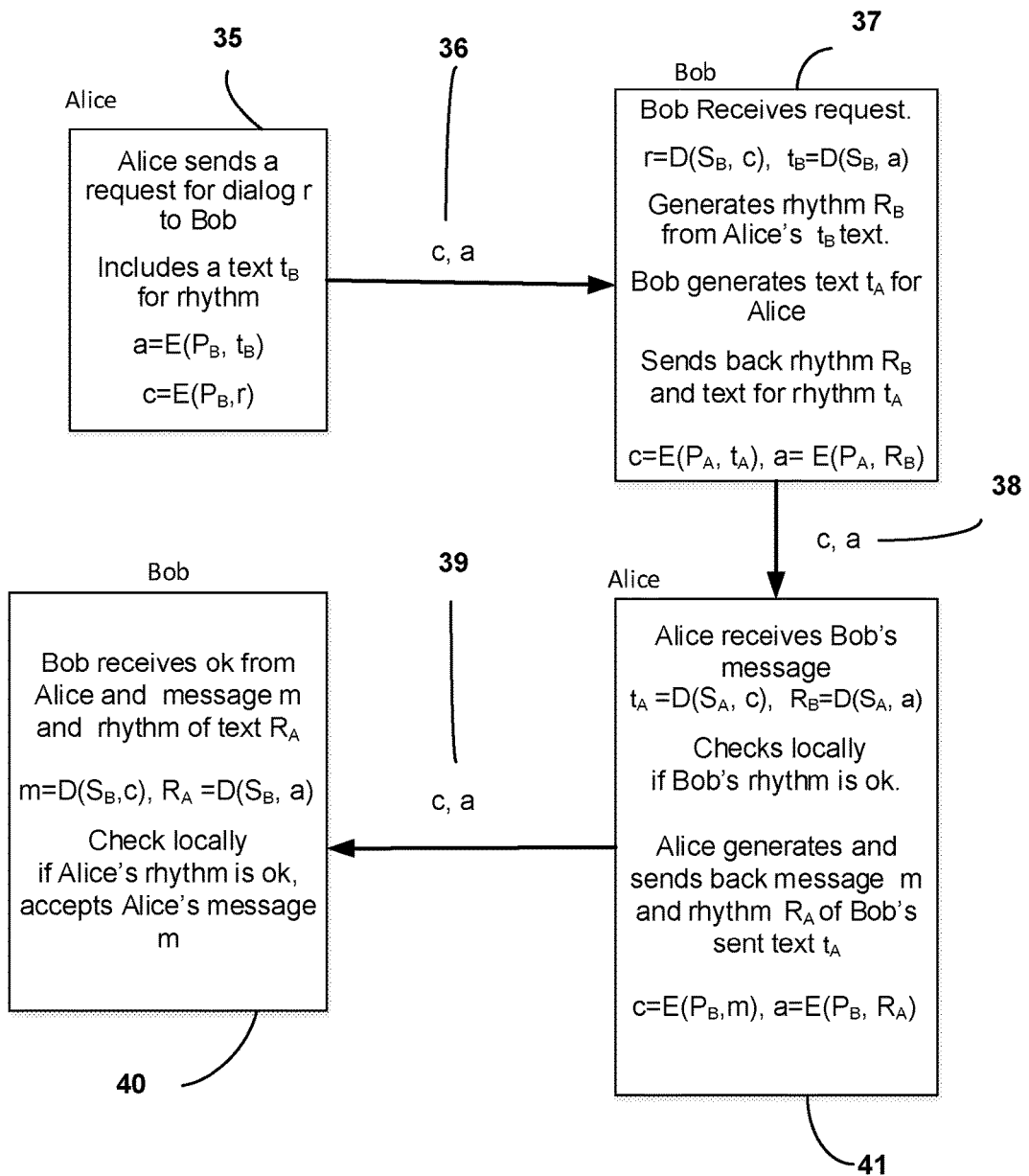
FIG. 5 is a block diagram illustrating the embodiment of a method to communicate between two parties using encryption and a local rhythm verifier.

FIG. 5 describes an example in which the parties communicates using encryption, and the rhythm verification is done locally. The encryption is done using the Public-key Encryption methodology Alice 35 sends a request for dialog r to Bob 37. Includes a text $t_B$ for rhythm. Encrypts the information for Bob 13 using his public key $P_B$
$a=E(P_B, t_B)$, $c=E(P_B, r)$.

Bob 37 receives Alice's message c,a 36 and proceeds to decrypt using his secure key $S_B$ and decrypt it: $r=D(S_B, c)$, $t_B=D(S_B, a)$. Then Bob 37 generates typing rhythm $R_B$ from Alice's $t_B$ text. Bob 37 also generates text $t_A$ for Alice. Sends back to Alice 41 the typing rhythm $R_B$ and text for rhythm $t_A$. Encrypt messages with Alice's public key $P_A$.
$c=E(P_A, t_A)$, $a=E(P_A, R_B)$ 38.

Alice 41 receives Bob's message 38 and decrypts them using Alice's secure key $S_A$.
$t_A=D(S_A, c)$, $R_B=D(S_A, a)$ Alice 41 then checks locally if Bob's typing rhythm is ok. Alice 41 generates and sends back message m and rhythm $R_A$ of Bob's sent text $t_A$. Encrypting the messages with Bob's public key $P_B$.
$c=E(P_B, m)$, $a=E(P_B, R_A)$ 39.

Bob 40 receives ok from Alice 41 and message m and rhythm of text $R_A$ decrypted using Bob's secure key $S_B$.
$m=D(S_B, c)$, $R_A=D(S_B, a)$
Bob 40 then checks locally if Alice's rhythm is ok, accepts Alice's message m.

Figure 6:
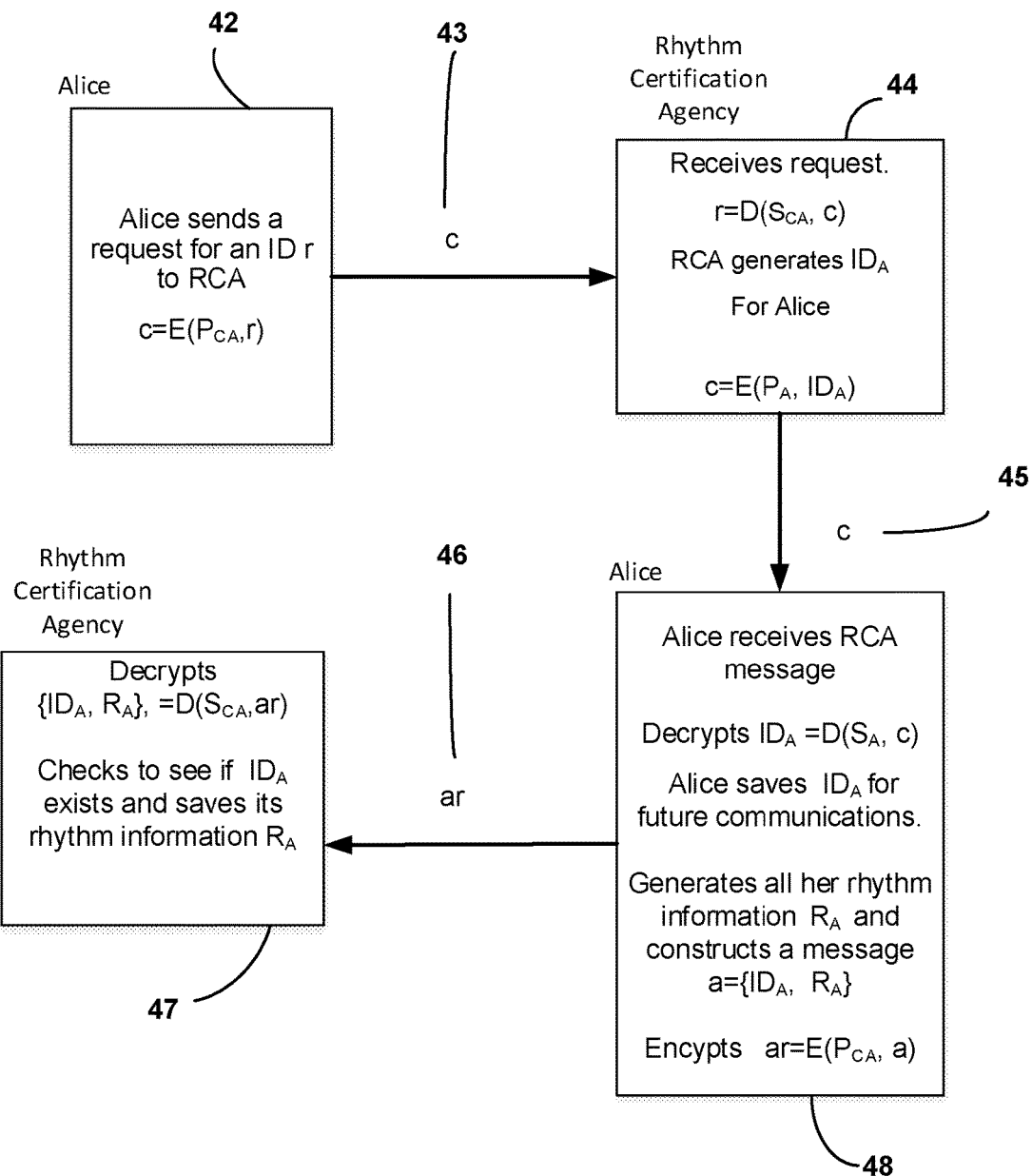
FIG. 6 is a block diagram illustrating the embodiment of a method to communicate between a user and the Rhythm Certification Agency.

FIG. 6 is a conceptual diagram illustrating an embodiment of an independent third party Rhythm Certification Agency. The encryption is done using the Public-key Encryption methodology (asymmetric encryption).

Alice 42 sends a request for an ID r to RCA 44. Encrypts the request for RCA 44 using RCA's public key $P_{CA}$
$c=E(P_{CA}, r)$ 43.

RCA 44 receives Alice's 42 request. Proceeds to decrypt using RCA's secure key $S_{CA}$.
$r=D(S_{CA}, c)$ RCA 44 then generates $ID_A$ for Alice 42, and encrypts the message back to Alice 48 using Alice's public key $P_A$
$c=E(P_A, ID_A)$ 45.

Alice 48 receives RCA 44 message. Decrypts the message using Alice's secure key $S_A$.
$ID_A=D(S_A, c)$
Alice 45 saves $ID_A$ for future communications.

Alice 45 generates all her rhythm information $R_A$ and constructs a message
$a=\{ID_A, R_A\}$
The message will be send to RCA 47.
Encrypts the message using RCA's public key $P_{CA}$.
$ar=E(P_{CA}, a)$ 45.

RCA 47 decrypts the message sent by Alice 45 using RCA's secure key $S_{CA}$ $\{ID_A, R_A\}, =D(S_{CA}, ar)$ RCA 47 checks to see if $ID_A$ exists and saves its rhythm information $R_A$ in its database.

The Rhythm Certification Authority (RCA) is an entity that in most cases needs to exist same as the certificate authority where Alice and Bob load and make it public their Public-key. The certificate authority (CA) is used for public key infrastructure (PKI) [7]. Each user takes his public key to the CA and identifies itself to the CA. The CA then signs the user's public key using a digital signature. We envision the RCA entity as an independent entity, or as an enhanced CA providing the rhythm services.

Figure 7:
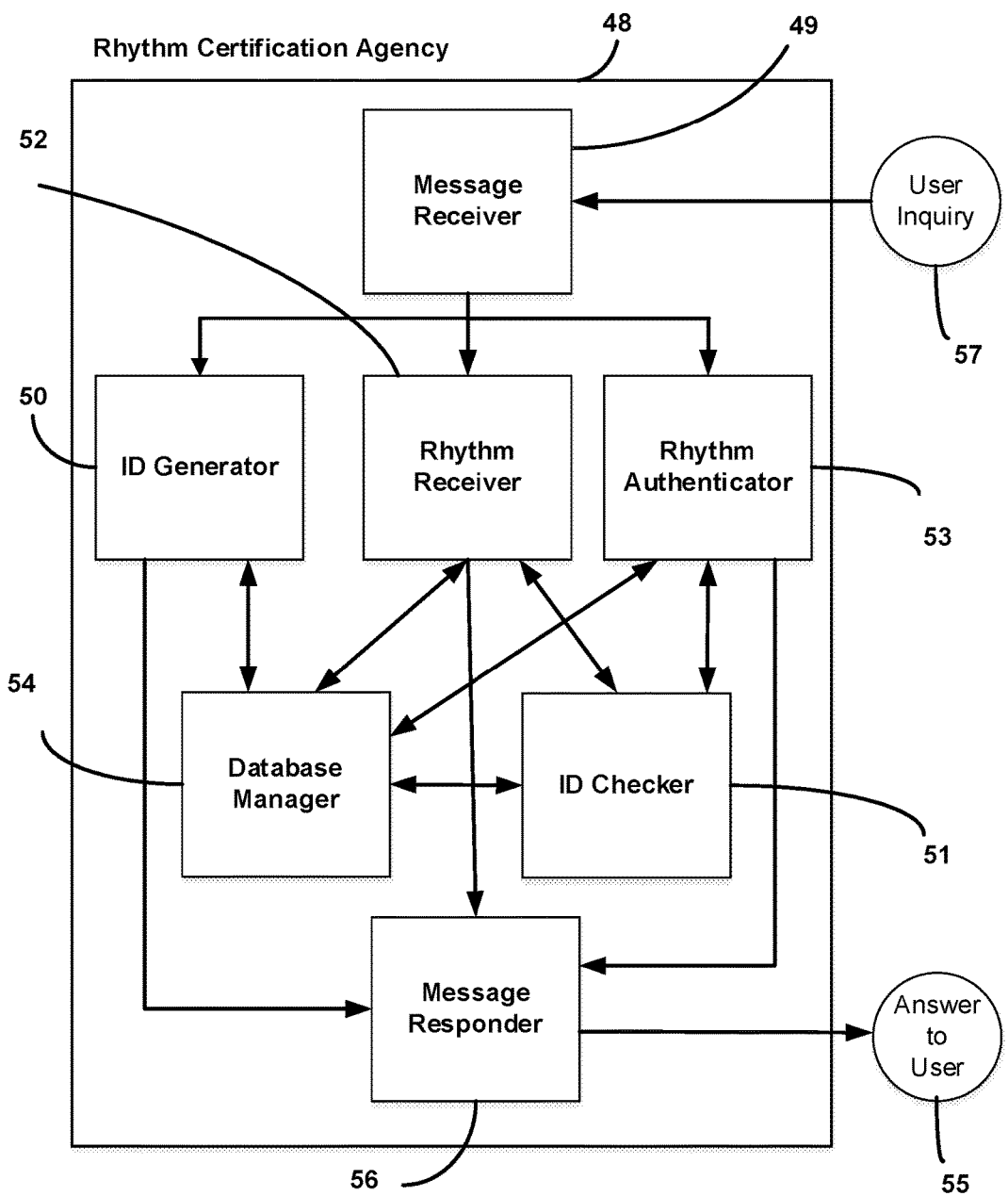
FIG. 7 is a conceptual diagram illustrating an embodiment of an independent third party Rhythm Certification Agency.

The RCA 48 in FIG. 7 is a web server comprising: a Message Receiver 49, an ID Generator 50, an ID Checker 51, a Rhythm Receiver 52, a Rhythm Authenticator 53, a Database Manager 54, and a Message Responder 56.

When a user wants to communicate with the RCA, sends an inquiry 57, received by the Message Receiver 49, which analyzes the inquiry, and calls the proper RCA module. If the message is for the creation of a new entry (i.e. a new user, or same user using a different device) in the database, the ID Generator 50 is called. This ID generator 50 request to the Database Manager 54 the next ID to assign the new user. The Database Manager 54 sends the next available ID in the system to the ID Generator 50, and updates this information in its database. The ID Generator 50 sends the assigned ID to the Message Responder 56, which generates a message (containing the ID assigned to this user) with the answer back to the user 55.

When the User Inquiry 57 received by the Message Receiver 49 is to verify the rhythm of a user, then the Rhythm Authenticator 53 is called. This module will check if the requested rhythm information is available. This is done by checking the Database Manger 54 via the ID Checker 51. If the information is available, the Database Manager 54 returns to the Rhythm Authenticator 53 the locally stored rhythm for the required ID. The Rhythm Authenticator 53 then proceeds to analyze the sent rhythm information and the locally stored one. Generates a response for the user.

FIG. 6 is a conceptual diagram illustrating a method to communicate between a user and the Rhythm Certification Agency numbers 44 and 47. The user request is for storing in RCA's database the user's typing rhythm. This RCA is an entity (server on the web) where users like Alice 42 and Bob can communicate. The first communication (of Alice or Bob) with the RCA will be a request to create an ID. This is done by encrypting this request to the RCA 44 $c=E(P_{CA}, r)$ 43.

The RCA 44 decrypts this information $r=D(S_{CA}, r)$ and proceeds to generate an ID for Alice 42 and responds back to Alice 48 with an encrypted message $c=E(P_A, ID_A)$ 45.

Alice 48 receives this information and decrypts it $ID_A=D(S_A, c)$. The $ID_A$ is saved by Alice 48 for future access to the RCA 44.

Once Alice 48 has the $ID_A$, it can proceed to send all the pertinent information about her typing rhythm. It is assumed that Alice has been collecting her rhythm for some period of time, and her rhythm data has reached a steady state (i.e. no significant changes in values with new measurements). The information could be as simple as the depressing times for any key, or the time to depress two consecutive keys, or any of the other most well known patterns described before.

The information saved may be the minimum and maximum times for Alice 48. This information along any other pertinent rhythm information is sent to RCA 47 by and encryption message ar 46 where $a=\{ID_A, R_A\}$ and $ar=E(P_{CA}, a)$. RCA 47 receives this information and decrypts it $\{ID_A,$ $R_A\}=D(S_{CA}, ar)$. RCA 47 first checks if $ID_A$ exists then proceeds to save the rhythm data send by $ID_A$.

The RCA is a single point of failure because it needs to decrypt every request and Distributed Denial of Service (DDoS) attacks can prevent every communication using the RCA. In order to avoid this scenario, we propose a slight modification to our main encryption algorithm.

This algorithm in its communication between Alice and Bob will require for Alice to send Bob an additional encrypted result of her rhythm. This data will be saved (i.e. the text sent and the rhythm results) by Bob when the RCA certifies that this is Alice signature. When later communicating if the RCA is inaccessible and both Bob and Alice agree on this fact, Bob will ask Alice to send again a rhythm for the saved data, and now Bob can validate Alice signature. They can continue communicating using this procedure until the RCA is available again. If the RCA becomes inaccessible without having Alice sent a single corroborated message to Bob, then both can agree if they want to continue communicating under this condition or stop until the RCA is available.

If the communication between Alice and Bob is not extremely important (i.e. not secret or top secret) then one authentication for Alice will be enough for Bob to accept her identity, On the other hand if the information is highly classified, the authentication will have to be done on every message.

The existence of a Rhythm Certification Authority (RCA) is going to be relatively easy and safe to implement, since the RCA will not know the identity of each user, only their rhythm information. This scheme could be implemented for more than one RCA, and crosscheck the results from two or more.

Figure 8:
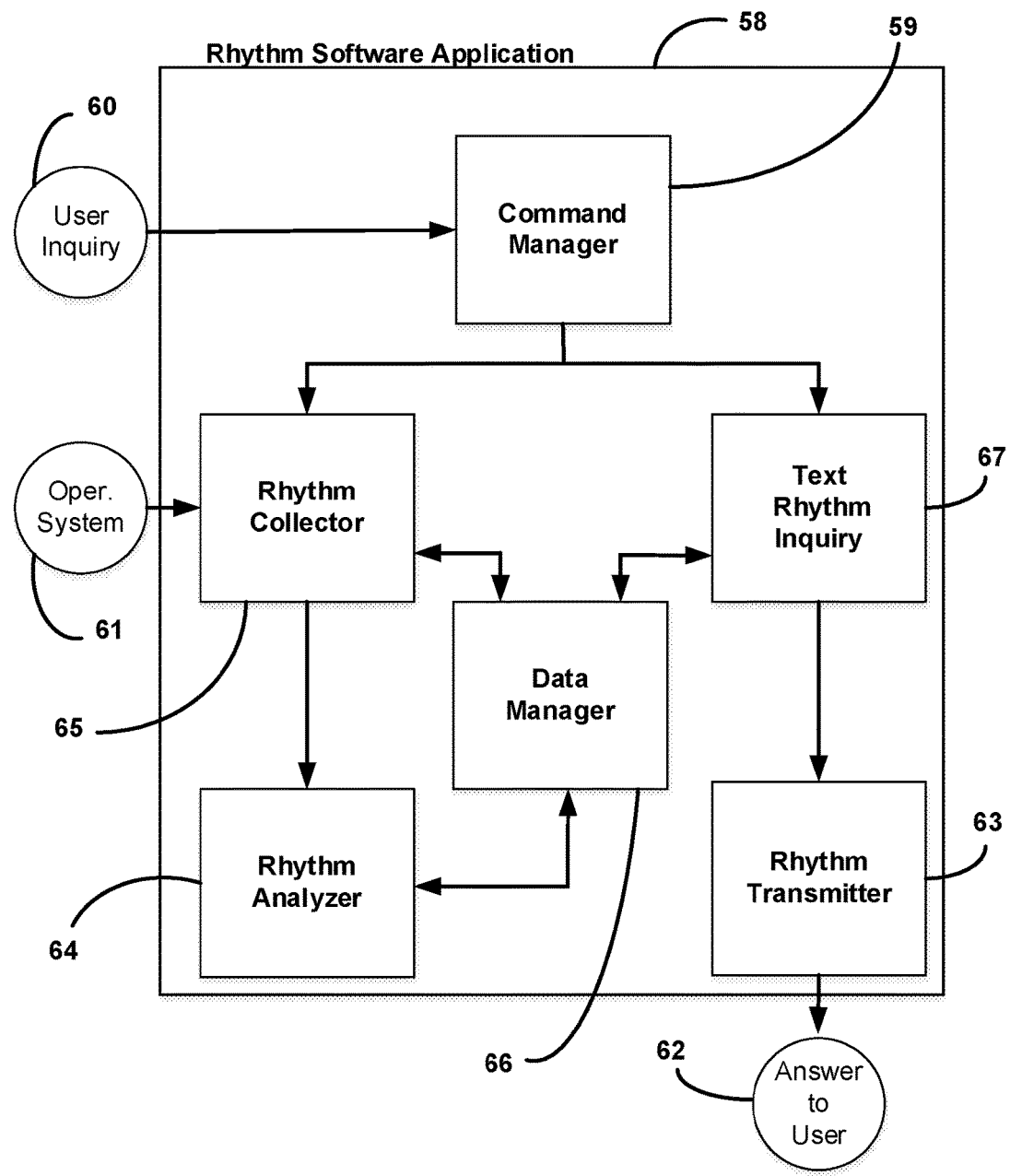
FIG. 8 is a block diagram illustrating the embodiment of a Rhythm Software Application.

FIG. 8 is a block diagram illustrating the embodiment of a Rhythm Software Application 58. The rhythm software application 58 runs locally on the user's computers and will collect, analyze and store the rhythm measurements of the user typing in the user's computer. There are two ways to call this software: when an event in the user's computer is related to the user's rhythm, the operating system 61 will send the information of the event to the Rhythm Software Application 58, or when a user types a User Inquiry 60, which is a user command.

This rhythm application software 58 is composed of six software modules. The first module the Rhythm Collector 65 receives from the Operating System 61 data of the user's typing rhythm on the local computer. The second module the Rhythm Analyzer 64 analyzes the measurements, saves the collected data and determines when the steady state of the measurements (i.e. the measurement does not change significantly the historical values of minimum and maximum values) has been achieved. To do this determination, several algorithms can be used. One of them is to check first if a high percentage of the different types (e.g. time pressing a key for each key, or time between X most used two letter words, etc.) of rhythm measurements have been used, and the amount of time elapsed since the last update to any of the data ranges of minimum and maximum values. The third module of the Rhythm Software Application 58 is the Rhythm Transmitter 63, which is the one who retrieves the stored user's information and prepares it in the proper format to be transmitted to the user 62. The fourth module is the Text Rhythm Inquiry 67 and is called by the Command Manager 59 when the user requests: a request to type a given text and return the user's rhythm of such typing, a request to transfer the complete user's rhythm information currently in local storage, or an end to capture the rhythm for the given text. The fifth module is the Command Manager 59, which receives commands directly form the user 60, decodes the command and calls the appropriate module to handle the requested command. The sixth module is the Data Management module 66, which stores and retrieves data for the whole software application.

The first command the user will give the rhythm software application is a start command, which will initialize the Rhythm Collector 65, the Rhythm Analyzer 64 and the Data Manager 66 modules. With this command, the rhythm software application will start running in the background of the Operating System, and will not be called until either the user gives a new command 60, or the Operating System 61 sends a typing rhythm data.

When a user 60 sends a command to start the typing rhythm collection of a text, the Command Manager 58 calls the Text Rhythm Inquiry 67, this module will contact the Data Manager 66 to set a flag indicating that future typing from the user will be collected separately. The Text Rhythm Inquiry 67 then calls the Rhythm Transmitter 63 to answer the user 62 that the command was received and started. From here on until and end of capture text rhythm is given by the user 60 the Rhythm Collector 65 when called, first will go an check if there is a text flag set (by inquiring the Data Manager 66), if this is not the case, it will continue normally by calling the Rhythm Analyzer 64 to continue with the normal typing rhythm of the user, but if the text flag was set, then the Rhythm Analyzer 64 will receive an indication that a special data collection is taking place (the one for the given text), and it will collect, store (using the Data Manager 66) and analyze the data for the specific typing text by the user.

When an end of capture text rhythm command is given by the user 60, the Command Manager 59 passes the information to the Text Rhythm Inquiry 67 module, which will retrieve form the Data Manger 66 the current typing rhythm for the given text provided previously, and sends this information to the Rhythm Transmitter 63 to answer the user 62 with the user's typing rhythm of the given text.

If the User Inquiry 60 is a command to download the current user's rhythm information, then the Command Manager 58, notifies the Text Rhythm Inquiry 67 module, which will retrieve form the Data Manger 66 the steady state user's current typing rhythm.

If the steady state has not been reached, the software application will notify the user 62 of this via the Rhythm Transmitter 63. If the steady state has been reached, the Rhythm Transmitter 63 prepares in the proper format the answer to the user 62 request to download the current user's rhythm information.

I believe that the methodology presented in this patent will increase the trust in the signature of a message encrypted or not, and if the messages are classified, this is a must do.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

I claim:

1. A method for secure message communication using internet as a communication network, wherein the method comprises: creating one or more messages by a sender; transmitting said on or more messages by a message transmitter; receiving said on or more messages by a receiver;

verifying said on or more messages by a third party rhythm verifier; creating on or more response messages by said receiver; receiving said on or more response messages by said sender; wherein said sender generates said message comprising: a dialog request and a first text for said receiver to type and capture said receiver's typing rhythm; wherein when said receiver receives said message, proceeding to type the first text and said sender captures said receiver's typing rhythm using a rhythm software application installed on said sender computer; wherein said receiver verifying said sender's typing rhythm by sending to said sender a data associated with said receiver's typing rhythm and a second text; wherein, when received the data and the second text, said sender proceeds to type the second text and said receiver captures said sender's typing rhythm using said rhythm software application installed on said receiver computer; wherein said sender receives said receiver's said response message containing said receiver's typing rhythm, and the second text for sender to capture said sender typing rhythm, and using said third party rhythm verifier to verify said receiver's typing rhythm; wherein said third party rhythm verifier compares and analyzes the data sent by said sender and the stored typing rhythm data for said receiver, receiving the verified data from said third party rhythm verifier, if said receiver's typing rhythm data is between acceptable range values the verification is accepted and said sender generates a first return message for said receiver, wherein the first return message including said sender's typing rhythm of said receiver's sent text, otherwise the verification is invalid; further, receiving the verified data from said third party rhythm verifier, if said sender's typing rhythm data is between acceptable range values the verification is accepted and said receiver accepts identity of said sender, otherwise the identity of said sender is rejected; wherein the third party rhythm verifier data is stored at an independent remote node; wherein a Rhythm Certification Authority (RCA) contains a digitally signed public key of said users, and said (RCA) provides Distributed Denial of Service (DDoS) attacks to all communications between said sender and said receiver; wherein users' identities are unknown to said (RCA), only users' rhythm information are known; wherein using the public key to encrypt and a secure key to decrypt all communications between said sender and said receiver; wherein said rhythm software application collects, analyzes and stores a rhythm measurements of user typing data, determining when a steady state of the measurements has been achieved; wherein said rhythm software application retrieves the stored said users rhythm information and transmits the rhythm information into proper format to respective user.

2. The method for secure message communication using a communication network of claim 1, wherein the cycle of secure communication between said sender and said receiver is repeated as needed.

\* \* \* \* \*